(12) United States Patent
Wang

(10) Patent No.: US 10,133,128 B2
(45) Date of Patent: Nov. 20, 2018

(54) DISPLAY SUBSTRATE, METHOD OF MANUFACTURING THE SAME, DISPLAY PANEL AND DISPLAY DEVICE

(71) Applicant: BOE TECHNOLOGY GROUP CO., LTD., Beijing (CN)

(72) Inventor: Yingtao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 13 days.

(21) Appl. No.: 15/124,594

(22) PCT Filed: Oct. 15, 2015

(86) PCT No.: PCT/CN2015/091965
§ 371 (c)(1),
(2) Date: Sep. 8, 2016

(87) PCT Pub. No.: WO2016/201833
PCT Pub. Date: Dec. 22, 2016

(65) Prior Publication Data
US 2017/0131598 A1    May 11, 2017

(30) Foreign Application Priority Data
Jun. 16, 2015 (CN) .......................... 2015 1 0335054

(51) Int. Cl.
*G02F 1/1343* (2006.01)
*G02F 1/1333* (2006.01)

(52) U.S. Cl.
CPC .... *G02F 1/134309* (2013.01); *G02F 1/13439* (2013.01); *G02F 1/133345* (2013.01);
(Continued)

(58) Field of Classification Search
CPC .................................................... G02F 1/1343
See application file for complete search history.

(56) References Cited

U.S. PATENT DOCUMENTS 8,144,295 B2 * 3/2012 Chang ............... G02F 1/136286
349/141
8,446,552 B2 * 5/2013 Pai ........................ G09G 3/3614
349/139

(Continued)

FOREIGN PATENT DOCUMENTS

CN          101995707 A        3/2011
CN          202210200 U        5/2012
(Continued)

OTHER PUBLICATIONS

International Search Report for International Patent Application No. PCT/CN2015/091965, dated Feb. 22, 2016, 14 pages.
(Continued)

*Primary Examiner* — Phu Vu
(74) *Attorney, Agent, or Firm* — Armstrong Teasdale LLP

(57) ABSTRACT

The present disclosure provides a display substrate including a plurality of first electrodes, a second electrode, and an insulating layer arranged among the first electrodes and the second electrode. The first electrodes are positioned above the second electrode. The second electrode includes a plurality of projections each, corresponding to a gap between two adjacent first electrodes and projecting towards the first electrodes.

17 Claims, 3 Drawing Sheets

(52) U.S. Cl.
CPC ............ *G02F 2001/134372* (2013.01); *G02F 2201/121* (2013.01); *G02F 2201/123* (2013.01)

(56) References Cited

U.S. PATENT DOCUMENTS

| | | | |
|---|---|---|---|
| 9,110,340 B2 * | 8/2015 | Wang | .................... G02F 1/1343 |
| 2007/0052898 A1 | 3/2007 | Yu et al. | |
| 2015/0146125 A1 * | 5/2015 | Kita | .................. G02F 1/133707 |
| | | | 349/43 |

FOREIGN PATENT DOCUMENTS

| | | | |
|---|---|---|---|
| CN | 102629040 A | 8/2012 |
| CN | 103149764 A | 6/2013 |
| CN | 103645589 A | 3/2014 |
| CN | 104298018 A | 1/2015 |
| CN | 104898332 A | 9/2015 |

OTHER PUBLICATIONS

English translation of the International Search Report for International Patent Application No. PCT/CN2015/091965, dated Feb. 22, 2016 (5 pages).
English translation of the Written Opinion of the International Searching Authority for International Patent Application No. PCT/CN2015/091965, dated Feb. 22, 2016 (6 pages).
China Office Action, Application No. 201510335054.8, dated May 2, 2017, 23 pps.
China Third Office Action, Application No. 201510335054.8, dated Apr. 18, 2018, 22 pps.: with English translation.

* cited by examiner

DISPLAY SUBSTRATE, METHOD OF MANUFACTURING THE SAME, DISPLAY PANEL AND DISPLAY DEVICE

CROSS-REFERENCE TO RELATED APPLICATION

The present disclosure is a National Stage entry of PCT/CN2015/091965 filed Oct. 15, 2015, which claims the benefit and priority of Chinese patent application No. 201510335054.8 filed on Jun. 16, 2015, both of which are incorporated herein by reference in their entirety.

BACKGROUND

The embodiments of the present disclosure relate to the display technical field, and particularly relate to a display substrate, a method of manufacturing the same, a display panel, and a display device.

A display device in mode of Advanced Super Dimension Switch (hereinafter referred to as ADS), by means of an electric field generated at edge of slit electrodes disposed within the same plane and a multi-dimensional electric field formed between the slit electrode layer and a plane-shaped electrode layer, enables all the liquid crystal molecules in a liquid crystal layer located between and above the slit electrodes to rotate and increase transmittance of a light through the liquid crystal layer and obtain a wider angle of view.

As shown in FIG. 1, an ADS device generally includes an array substrate 1, a color film substrate 2, and a liquid crystal layer 3 located between the array substrate 1 and the color film substrate 2. The array substrate 1 includes a lower substrate 10, a lower polarizer 11 prepared at bottom side of the lower substrate 10, a thin film transistor (not shown) prepared at top side of the lower substrate 10, a common electrode 12, an insulating layer 13 and a pixel electrode 14. The color film substrate 2 includes an upper substrate 20, a color light filter (not shown) prepared at bottom side of the upper substrate 20, and an upper polarizer 211 prepared at top side of the upper substrate 20.

There is a demand for an increase in size and improved resolution for ADS display devices. However, along with increase of size and improvement of resolution, the delay of signal during a transmission process increases. Moreover, storage capacitance between common electrode and pixel electrode will also become overlarge, which will lead to problems such as display errors in row direction, slow discharge, and residual image etc. As for a display device having a higher refresh rate, overlarge storage capacitance will further lead to display green shift.

The existing solution for solving the problem of overlarge storage capacitance above is to thicken the insulating layer 13 so that the distance between the common electrode 12 and the pixel electrode 14 increases so as to facilitate reduction of the storage capacitance between the common electrode 12 and the pixel electrode 14. However, the solution above creates a problem. As the distance between the common electrode 12 and the pixel electrode 14 increases, driving voltage required for realizing display of pixels will also increase. As shown in FIG. 2, when the thickness of the insulating layer 13 between the common electrode 12 and the pixel electrode 14 increases, driving voltage of the display device will also increase, which may result in an increase of power consumption of the display device.

BRIEF DESCRIPTION

The present disclosure aims to solve at least one of the technical problems of known ADS devices. There is provided a display substrate, a method of manufacturing the same, a display panel, and a display device, which may avoid an increase of driving voltage and reduce storage capacitance between common electrode and pixel electrode so as to realize lower power consumption in a product having a high resolution and a large size.

The present disclosure provides a display substrate including a plurality of first electrodes, a second electrode, and an insulating layer arranged among the first electrodes and the second electrode, wherein the first electrodes are positioned above the second electrode, the second electrode comprises a plurality of projections each corresponding to a gap region between two adjacent first electrodes and projecting towards the first electrodes.

Therein, the width of each of the projections of the second electrode is smaller than the width of a gap between adjacent first electrodes corresponding to the projection.

Therein, the height of the projection is smaller than a distance between the first electrode and the second electrode.

Therein, the first electrode is a pixel electrode and the second electrode is a common electrode. Alternatively, the first electrode is a common electrode and the second electrode is a pixel electrode.

Therein, the height of the projection is smaller than the thickness of the insulating layer between the first electrode and the second electrode.

Therein, the cross-section shape of the projection of the second electrode in a plane perpendicular to the length direction of the first electrode is one of trapezoidal, triangular, and rectangular.

Therein, the first electrode is a bar-shaped electrode, and the second electrode is a plane-shaped electrode.

In another embodiment, the present disclosure further provides a method of manufacturing the display substrate above, comprising:

forming a bump on a substrate by a patterning process;

forming a pattern of a second electrode by a patterning process;

forming a pattern of an insulating layer by a patterning process; and forming a pattern of a first electrode by a patterning process, wherein the position of the bump corresponds to a gap between adjacent first electrodes.

Therein, the height of the projection is smaller than the thickness of the insulating layer between the first electrode and the second electrode.

Therein, the first electrode is bar-shaped, and the second electrode is plane-shaped.

In another embodiment, the present disclosure further provides a display panel, including the display substrate above.

In another embodiment, the present disclosure further provides a display device, including the display panel above.

The present disclosure has the following advantageous effects:

As for the display substrate provided by the present disclosure, the distance between the projection of the second electrode thereof and the gap between the adjacent first electrodes is smaller than the thickness of the insulating layer between the first electrodes and the second electrode. Compared to known devices, the distance between the gap between the adjacent first electrodes and the region on the second electrode corresponding to the gap is smaller so as to reduce the storage capacitance among the first electrodes and second electrode in case where the thickness of the insulating layer between the first electrodes and second electrode is great. This configuration avoids problems such as display errors, residual images, and display green shift. Driving voltage needed by pixel display is reduced, and thus power consumption is reduced.

The method of manufacturing the display substrate provided by the present disclosure prepares the display substrate which may reduce the storage capacitance among the first electrodes and second electrode in case where the thickness of the insulating layer between the first electrodes and second electrode is great. This configuration avoids problems such as display errors, residual images, and display green shift. Driving voltage needed by pixel display is reduced, and thus power consumption is reduced.

The display panel provided by the present disclosure may be used to reduce the storage capacitance among the first electrodes and second electrode in case where the thickness of the insulating layer between the first electrodes and second electrode is great. This configuration avoids problems such as display errors, residual images, and display green shift. Driving voltage needed by pixel display is reduced, and thus power consumption is reduced.

The display device provided by the present disclosure may be used to reduce the storage capacitance among the first electrodes and second electrode in case where the thickness of the insulating layer between the first electrodes and second electrode is great. This configuration avoids problems such as display errors, residual images, and display green shift. Driving voltage needed by pixel display is reduced, and thus power consumption is reduced.

BRIEF DESCRIPTION OF THE DRAWINGS

The drawings are used to provide further understanding of the present disclosure, constitute a part of the description, and are construed as explaining the present disclosure in conjunction with the following concrete embodiments, but shall not be construed as restrictions to the present disclosure. Wherein.

DETAILED DESCRIPTION

Preferred embodiments of the present disclosure will be specified in detail in conjunction with drawings below. It shall be appreciated that the preferred embodiments described here are only used to described and explain the present disclosure, but will not be used to restrict the present disclosure.

Figure 1:
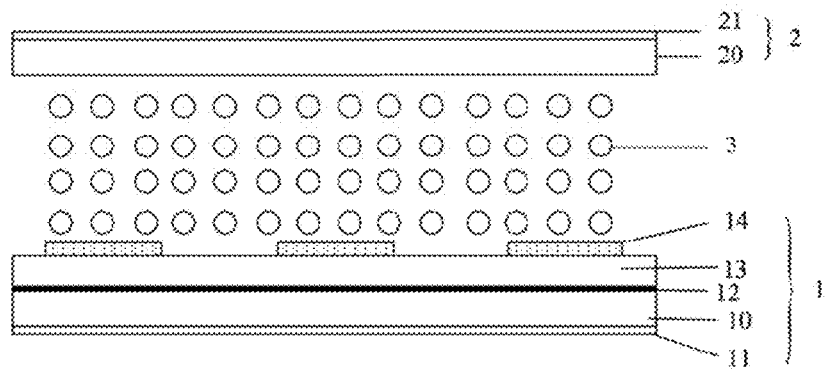
FIG. 1 is a schematic diagram of an existing ADS display device.
Figure 2:
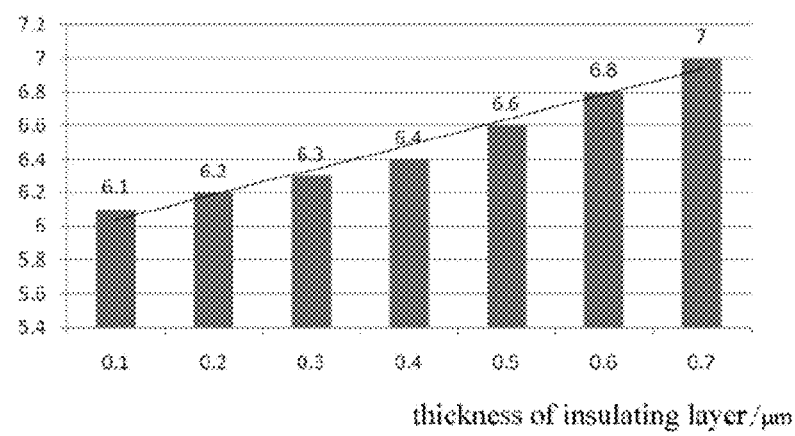
FIG. 2 is a schematic diagram of the relationship between thickness of an insulating layer and the driving voltage needed by a pixel display.
Figure 3:
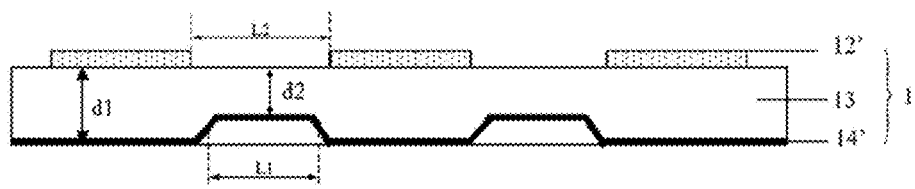
FIG. 3 is a schematic diagram of the display substrate provided by an embodiment of the present disclosure.

The present disclosure provides an embodiment of a display substrate. FIG. 3 is a schematic diagram of the display substrate provided by an embodiment of the present disclosure. As shown in FIG. 3, in this embodiment, the display substrate 1 is an ADS display substrate, including a first electrode 12' and a second electrode 14', and an insulating layer 13 arranged between the first electrode 12' and second electrode 14', wherein the first electrode 12' is positioned above the second electrode 14'. The first electrode 12' is preferably a bar-shaped electrode, and the second electrode 14' is preferably a plane-shaped electrode. The second electrode 14' includes a plurality of projections each corresponding to a gap region between two adjacent first electrodes 12' and projecting towards the first electrode 12'. As shown in FIG. 3, the projection is located at a position corresponding to a gap between two first electrodes 12', which means at a position corresponding to the gap. In other words, the projection is located below the gap. Preferably, a projection is disposed at a position corresponding to each gap.

As shown in FIG. 3, the distance between the first electrode 12' and second electrode 14', i.e., thickness of insulating layer 13 between the first electrode 12' and second electrode 14' is d1, and the distance between projection of the second electrode 14' and an adjacent first electrode 12' is d2. As can be known, d1>d2. Compared to the known devices, in the embodiment, the distance between the gap between adjacent first electrodes 12' and a region on the second electrode 14' corresponding to the gap is smaller, so that thickness of insulating layer 13 disposed between the first electrode 12' and second electrode 14' is greater, which means value of d1 is greater to reduce the storage capacitance between the first electrode 12' and second electrode 14' so as to avoid problems such as display errors, residual images and display green shift, while driving voltage needed by pixel display is reduced, and thus power consumption is reduced.

In the embodiment, width L1 of each projection on the second electrode 14' is smaller than width of gap L2 between adjacent first electrodes 12' corresponding to the projection. Such an arrangement is used to ensure that distances between respective parts of the first electrode 12' and second electrode 14' are kept as d1 so that they will not be reduced due to the projection, so as to avoid increase of storage capacitance between the first electrode 12' and second electrode 14' as well as problems such as display errors, residual images and display green shift caused thereby.

Specifically, height of the projection on the second electrode 14' is smaller than distance d1 between the first electrode 12' and second electrode 14', i.e., thickness of the insulating layer 13 between the first electrode 12' and second electrode 14'. It will be appreciated that the smaller the height of the projection is, the lower the difficulty of manufacturing the projection as well as the ADS display substrate is. In contrary, the higher the height of the projection is, the higher the difficulty of manufacturing the projection as well as an ADS display substrate is. Therefore, such an arrangement may lower difficulty of the process in the course of manufacturing an ADS display substrate. Furthermore, in the embodiment, the range of value of d1 is preferably 0.1-0.6 μm.

In the embodiment, the first electrode 12' may be a pixel electrode, and the second electrode 14' may be a common electrode. In such a case, the pixel electrode is located at the top and it is a bar-shaped electrode while the common electrode is located at the bottom and it is a plane-shaped electrode. Alternatively, the first electrode 12' may also be a common electrode, and the second electrode 14' may be a pixel electrode. Nevertheless, in such a case, the pixel electrode is located at the bottom and it is a plane-shaped electrode while the common electrode is located at the top and it is a bar-shaped electrode.

Figure 4:
FIG. 4 is a schematic diagram where the cross-section shape of the projection of the second electrode is triangular.

Specifically, as shown in FIG. 3, the cross-section shape of the projection of the second electrode 14' in a plane perpendicular to the length direction of the first electrode 12' is trapezoidal, and it may further be triangular as shown in FIG. 4. In addition, it may further be rectangular or various other shapes.

As for the ADS display substrate provided by the embodiment, the distance d2 between the projection of the second electrode 14' and the gap between adjacent first electrodes 12' is smaller than the thickness of the insulating layer 13 between the first electrode 12' and second electrode 14', i.e., d1. Compared to known devices, in the embodiment, the distance between the gap between adjacent first electrodes 12' and the region on the second electrode 14' corresponding to the gap is smaller, so that thickness of the insulating layer 13 between the first electrode 12' and second electrode 14' is greater to reduce the storage capacitance between the first electrode 12' and second electrode 14' so as to avoid problems such as display errors, residual images and display green shift, while driving voltage needed by pixel display is reduced, and thus power consumption is reduced.

Figure 5:
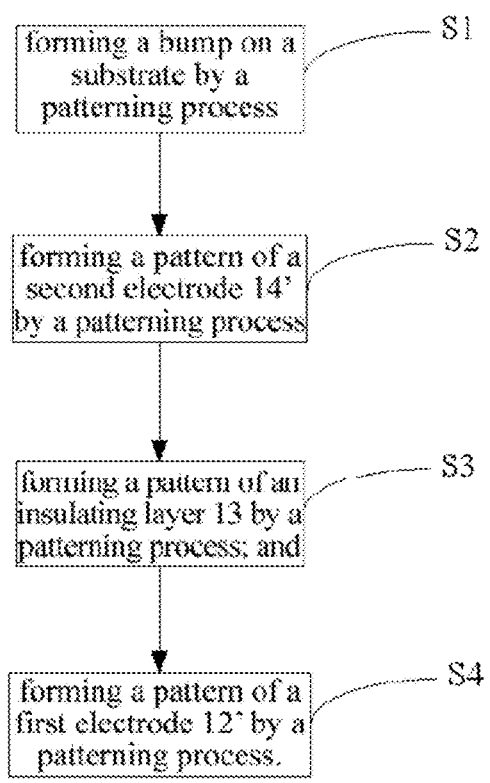
FIG. 5 is a flow chart of the method of manufacturing the display substrate provided by an embodiment of the present disclosure.
Figure 6:
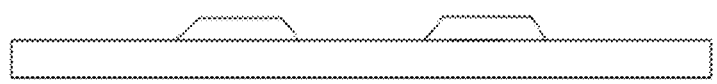
FIG. 6 is a schematic diagram after formation of a bump is finished.

The present disclosure further provides an embodiment of a method of manufacturing the display substrate above. FIG. 5 is a flow chart of the method of manufacturing the display substrate provided by the embodiment of the present disclosure. As shown in FIG. 5, in the embodiment, the method of manufacturing the display substrate includes the following steps S1-S4:

S1, forming a bump on a substrate by a patterning process, as shown in FIG. 6.

Specifically, at step S1, the patterning process forming the bump generally includes steps of deposition→coating→exposure→development→etching→peeling off etc., wherein the position where the bump is formed is the region of the projection of the second electrode.

Figure 7:
FIG. 7 is a schematic diagram after formation of a second electrode is finished.

S2, forming a pattern of the second electrode 14' by a patterning process, the second electrode 14' preferably being plane-shaped, as shown by FIG. 7.

Specifically, the patterning process of forming the pattern of the second electrode 14' has steps similar to those of the patterning process forming the bump.

At the step S2, due to existence of the bump, when the pattern of the second electrode 14' is formed, the position corresponding to the bump will project correspondingly so as to form the projection of the second electrode 14'.

Figure 8:
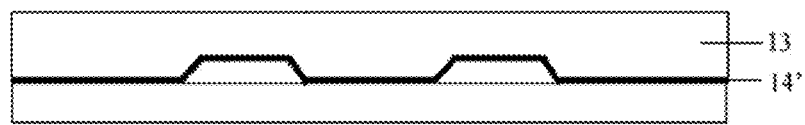
FIG. 8 is a schematic diagram after formation of an insulating layer is finished.

S3, forming a pattern of the insulating layer 13 by a patterning process, as shown in FIG. 8.

Figure 9:
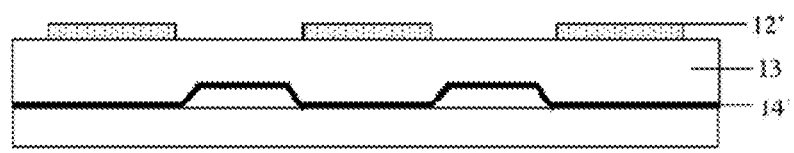
FIG. 9 is a schematic diagram after formation of a first electrode is finished.

S4, forming a pattern of the first electrode 12' by a patterning process, wherein the first electrode 12' is preferably bar-shaped, and wherein position of the bump corresponds to the gap between adjacent first electrodes 12', as shown in FIG. 9.

As for the display substrate prepared in the embodiment, distance d2 between the projection of the second electrode 14' and the gap between adjacent first electrodes 12' is smaller than the thickness of the insulating layer 13 between the first electrode 12' and second electrode 14', i.e., d1. Compared to known devices, in the embodiment, the distance between the gap between the adjacent first electrodes 12' and the region on the second electrode 14' corresponding to the gap is smaller, so that the thickness of the insulating layer 13 between the first electrode 12' and second electrode 14' can be greater to reduce the storage capacitance between the first electrode 12' and second electrode 14' so as to avoid problems such as display errors, residual images and display green shift, while driving voltage needed by pixel display is reduced, and thus power consumption is reduced.

Preferably, height of the bump is smaller than the thickness of the insulating layer 13 between the first electrode 12' and second electrode 14'. It will be appreciated that the smaller the height of the bump is, the lower the difficulty of forming the shape of the required projection is in process of manufacturing the pattern of the second electrode 14'. In contrary, the higher the height of the bump is, the higher the difficulty of forming the shape of the required projection is in process of manufacturing the pattern of the second electrode 14'. Therefore, such an arrangement may lower the difficulty of the process in course of manufacturing an ADS display substrate.

Figure 10:
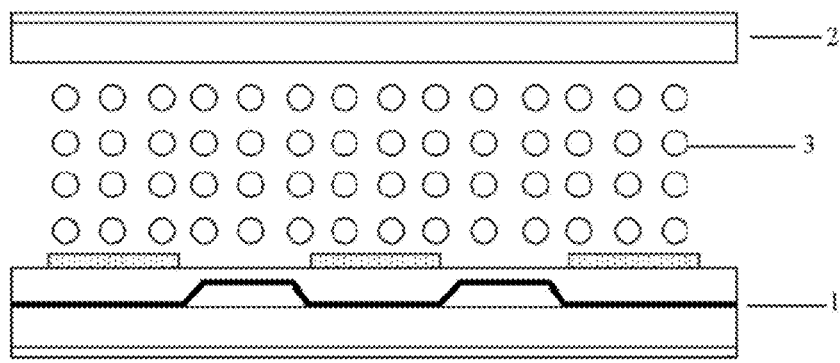
FIG. 10 is a schematic diagram of the display panel provided by an embodiment of the present disclosure.

The present disclosure further provides an embodiment of a display panel, and FIG. 10 is a schematic diagram of the display panel provided in the embodiment of the present disclosure. As shown in FIG. 10, in the embodiment, the display panel includes the display substrate 1 provided by the above embodiment of the present disclosure, and it further includes a paired box substrate 2 which pair-boxes with the display substrate 1, and a liquid crystal layer 3 disposed between paired box substrate 2 and display substrate 1.

The display panel provided in the embodiment of the present disclosure uses the display substrate provided in the embodiment of the present disclosure to reduce the storage capacitance between the first electrode and second electrode in case where the thickness of the insulating layer between the first electrode and second electrode is great, and avoid problems such as display errors, residual images and display green shift, while driving voltage needed by pixel display is reduced, and thus power consumption is reduced.

The present disclosure further provides an embodiment of a display device. In the embodiment, the display device includes the display panel provided in the embodiment above.

The display device provided in the embodiment of the present disclosure uses the display panel provided in the embodiment of the present disclosure to reduce the storage capacitance between the first electrode and second electrode in case where the thickness of the insulating layer between the first electrode and second electrode is great, and avoid problems such as display errors, residual images and display green shift, while driving voltage needed by pixel display is reduced, and thus power consumption is reduced.

It can be appreciated that the above embodiments are merely exemplary used for explaining principles of the present disclosure. However, the present disclosure is not restricted to this. Those skilled in the art may make modifications and variations without departing from the spirit and essence of the present disclosure, and these modifications and variations will also be deemed to be within the protection scope of the present disclosure.

What is claimed is:

1. A display substrate, comprising:
   a plurality of first electrodes;
   a second electrode; and
   an insulating layer arranged between the first electrodes and the second electrode, wherein the first electrodes are positioned above the second electrode, wherein the second electrode comprises a plurality of projections each corresponding to a gap between two adjacent first electrodes and projecting towards the first electrodes, and wherein a thickness of the insulating layer between the first electrodes and the second electrode is thicker than a thickness of the insulating layer between the projection of the second electrode and the gap between two adjacent first electrodes.

2. The display substrate according to claim 1, wherein a width of each of the projections of the second electrode is smaller than a width of a gap between adjacent first electrodes corresponding to the projection.

3. The display substrate according to claim 1, wherein a height of each projection is smaller than a vertical distance between the first electrode and the second electrode.

4. The display substrate according to claim 1, wherein the first electrode is a pixel electrode and the second electrode is a common electrode.

5. The display substrate according to claim 1, wherein a height of each projection is smaller than the thickness of the insulating layer between the first electrodes and the second electrode.

6. The display substrate according to claim 1, wherein a cross-section shape of each projection in a plane perpendicular to a length direction of the first electrode is one of trapezoidal, triangular, and rectangular.

7. The display substrate according to claim 1, wherein each first electrode is a bar-shaped electrode, and wherein the second electrode is a plane-shaped electrode.

8. A method of manufacturing the display substrate according to claim 1, comprising:

forming a bump on a substrate by a patterning process;

forming a pattern of a the second electrode by a patterning process, wherein the second electrode comprises a projection of the plurality of projections at a position corresponding to the bump;

forming a pattern of the insulating layer by a patterning process; and forming a pattern of the plurality of first electrodes by a patterning process, wherein the projection of the second electrode corresponds to a gap between adjacent first electrodes.

9. The method according to claim 8, wherein a height of the projection is smaller than a thickness of the insulating layer between the first electrode and the second electrode.

10. The method according to claim 8, wherein the first electrode is bar-shaped, and wherein the second electrode is plane-shaped.

11. A display panel, comprising the display substrate according to claim 1.

12. A display device, comprising the display panel according to claim 11.

13. The display substrate according to claim 1, wherein the first electrode is a common electrode and the second electrode is a pixel electrode.

14. The display substrate according to claim 2, wherein the first electrode is a pixel electrode and the second electrode is a common electrode.

15. The display substrate according to claim 2, wherein the first electrode is a common electrode and the second electrode is a pixel electrode.

16. The display substrate according to claim 3, wherein the first electrode is a pixel electrode and the second electrode is a common electrode.

17. The display substrate according to claim 3, wherein the first electrode is a common electrode and the second electrode is a pixel electrode.

* * * * *